(12) United States Patent
Lin et al.

(10) Patent No.: US 10,782,747 B2
(45) Date of Patent: *Sep. 22, 2020

(54) ADAPTABLE STORAGE BAY FOR SOLID STATE DRIVES

(71) Applicant: SUPER MICRO COMPUTER, INC., San Jose, CA (US)

(72) Inventors: Te-Chang Lin, San Jose, CA (US); Lawrence Lam, San Jose, CA (US); Thompson Tang, San Jose, CA (US)

(73) Assignee: SUPER MICRO COMPUTER, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/438,038

(22) Filed: Jun. 11, 2019

(65) Prior Publication Data
US 2020/0097054 A1     Mar. 26, 2020

Related U.S. Application Data

(63) Continuation of application No. 16/138,793, filed on Sep. 21, 2018, now Pat. No. 10,359,815.

(51) Int. Cl.
| | |
|---|---|
| *G06F 1/18* | (2006.01) |
| *G06F 13/38* | (2006.01) |
| *G06F 13/40* | (2006.01) |
| *H01R 12/70* | (2011.01) |
| *G06F 1/26* | (2006.01) |
| *H01R 12/73* | (2011.01) |
| *G06F 1/20* | (2006.01) |
| *H01R 12/52* | (2011.01) |

(Continued)

(52) U.S. Cl.
CPC .............. *G06F 1/183* (2013.01); *G06F 1/186* (2013.01); *G06F 1/20* (2013.01); *G06F 1/26* (2013.01); *G06F 13/387* (2013.01); *G06F 13/4081* (2013.01); *H01R 12/523* (2013.01); *H01R 12/7076* (2013.01); *H01R 12/721* (2013.01); *H01R 12/737* (2013.01); *H01R 13/6675* (2013.01)

(58) Field of Classification Search
CPC .......... G06F 1/185; G06F 1/186; G06F 13/38; G06F 13/385; G06F 13/387
See application file for complete search history.

(56) References Cited

U.S. PATENT DOCUMENTS

| | | | | |
|---|---|---|---|---|
| 7,660,346 B1 * | 2/2010 | Klissner | ................ | G06F 13/385 375/219 |
| 10,359,815 B1 * | 7/2019 | Lin | .................... | H01R 12/7076 |

(Continued)

*Primary Examiner* — Adrian S Wilson
(74) *Attorney, Agent, or Firm* — Okamoto & Benedicto LLP

(57) ABSTRACT

A solid state drive (SSD) storage bay includes storage trays and connector cards. A storage tray has a an interposer and an SSD module. A connector of the interposer is connected to a connector of the SSD module, and another connector of the interposer is connected to a connector of a connector card. The connector card includes terminals that connect to a bus of a computer system. The interposer includes wirings that allow electrical signals to propagate between the two connectors of the interposer. The interposer includes circuitry that allow for voltage regulation of supply voltage, level shifting, and hot-swapping.

19 Claims, 8 Drawing Sheets

(51) Int. Cl.
*H01R 13/66* (2006.01)
*H01R 12/72* (2011.01)

(56) References Cited

U.S. PATENT DOCUMENTS

| | | | |
|---|---|---|---|
| 2007/0223188 A1* | 9/2007 | Colborn | G06F 1/183 361/679.33 |
| 2008/0256281 A1* | 10/2008 | Fahr | G06F 13/16 710/305 |
| 2010/0095048 A1* | 4/2010 | Bechtolsheim | G06F 11/1441 711/103 |
| 2015/0205746 A1* | 7/2015 | Bailey | G06F 13/385 710/315 |
| 2016/0073544 A1* | 3/2016 | Heyd | G11B 33/128 361/679.31 |

* cited by examiner

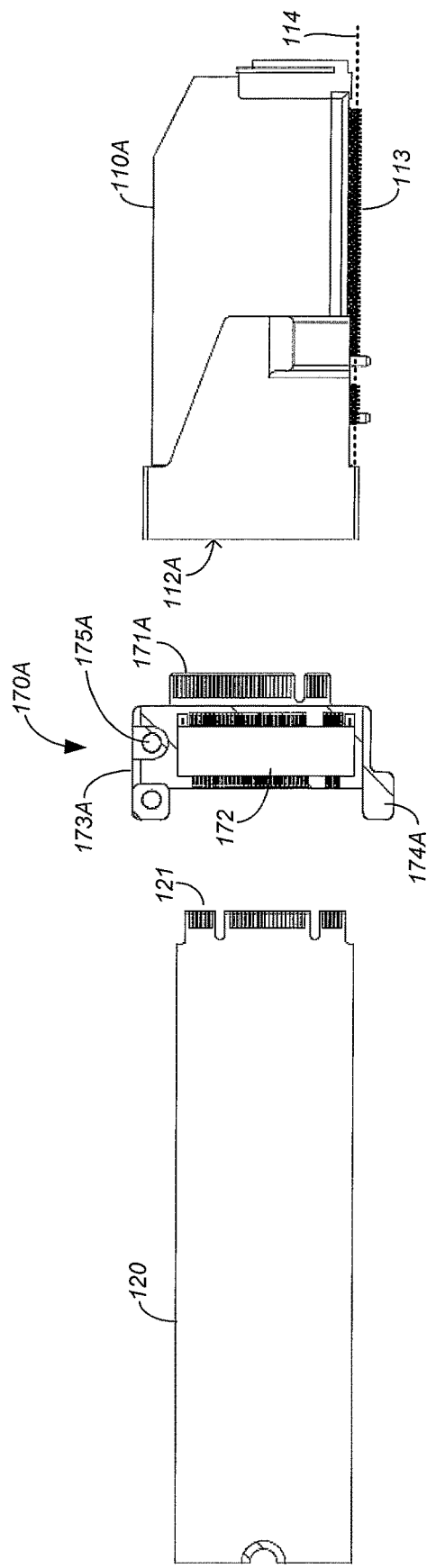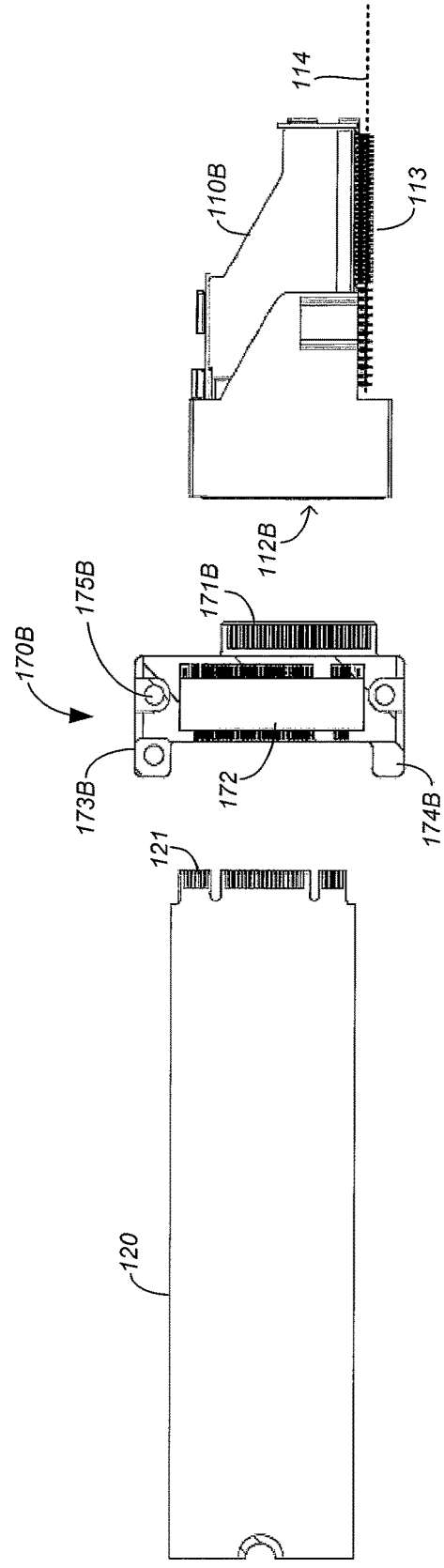
FIG. 8
FIG. 9

US 10,782,747 B2

ADAPTABLE STORAGE BAY FOR SOLID STATE DRIVES

CROSS-REFERENCE TO RELATED APPLICATION

This application is a continuation of U.S. application Ser. No. 16/138,793, filed Sep. 21, 2018, now U.S. Pat. No. 10,359,815, which is incorporated herein by reference in its entirety.

BACKGROUND OF THE INVENTION

1. Field of the Invention

The present invention relates generally to computer systems, and more particularly but not exclusively to storage devices.

2. Description of the Background Art

As is well known, a computer drive is a storage device used by computer systems. Solid state drives, such as those with integrated circuit (IC) non-volatile memory (e.g., non-volatile flash memory), are much faster than conventional electro-mechanical hard disk drives. Solid state drives with IC non-volatile memory are referred to herein as SSD modules. For example, the Non-Volatile Memory Express (NVME) specification provides for accessing solid state drives that are attached to a computer system by way of a Peripheral Controller Interconnect Express (PCIE) bus.

SSD modules that comply with the NVME specification are referred to herein as NVME modules. In computer systems that require large amounts of storage space, NVME modules may be installed in dedicated storage bays. For example, NVME modules may be mounted in corresponding storage trays, which are removably attached to a storage bay. Examples of storage bays for NVME modules include the SUPERMICRO® NVME platforms, which are commercially-available from Super Micro Computer, Inc. of San Jose, Calif.

SUMMARY

In one embodiment, a solid state drive (SSD) storage bay includes storage trays and connector cards. A storage tray has a an interposer and an SSD module. A connector of the interposer is connected to a connector of the SSD module, and another connector of the interposer is connected to a connector of a connector card. The connector card includes terminals that connect to a bus of a computer system. The interposer includes wirings that allow electrical signals to propagate between the two connectors of the interposer. The interposer includes circuitry that allow for voltage regulation of supply voltage, level shifting, and hot-swapping.

These and other features of the present invention will be readily apparent to persons of ordinary skill in the art upon reading the entirety of this disclosure, which includes the accompanying drawings and claims.

DESCRIPTION OF THE DRAWINGS

FIG. 8 shows an arrangement of an SSD module, an interposer, and a connector card in accordance with an embodiment of the present invention.

FIG. 9 shows an arrangement of an SSD module, an interposer, and a connector card in accordance with another embodiment of the present invention.

The use of the same reference label in different drawings indicates the same or like components. Drawings are not necessarily to scale unless otherwise noted.

DETAILED DESCRIPTION

In the present disclosure, numerous specific details are provided, such as examples of systems, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 1:
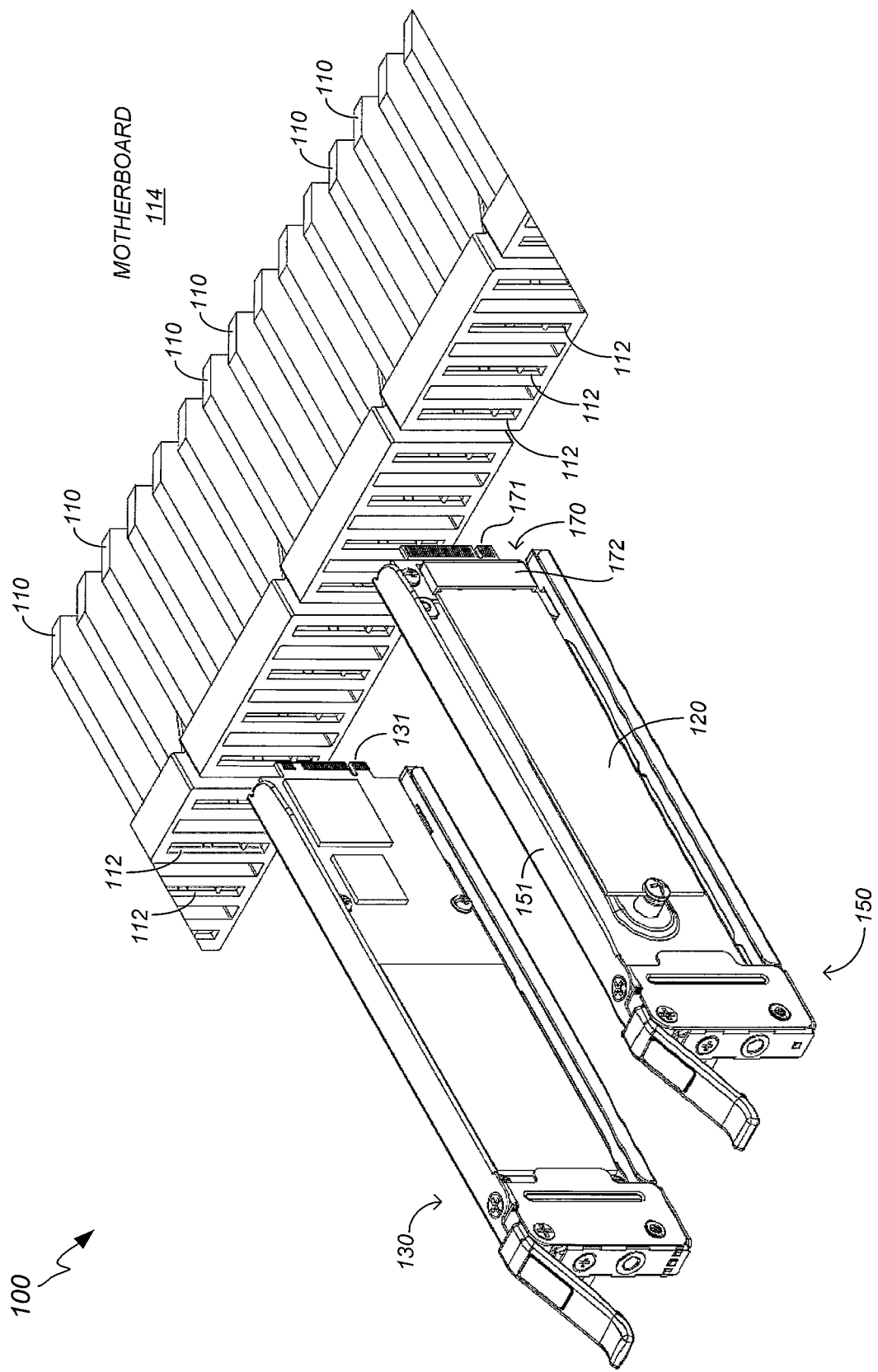
FIG. 1 shows a partial perspective view of a storage bay in accordance with an embodiment of the present invention.

FIG. 1 shows a partial perspective view of a storage bay 100 in accordance with an embodiment of the present invention. In the example of FIG. 1, the storage bay 100 includes a chassis (not shown) that allows the storage bay 100 to be mounted on an equipment rack along with other storage bays. The storage bay 100 may include a plurality of connector cards 110 and a plurality of storage trays 150, 130. Only some of the connector cards 110 and corresponding bay connectors 112 are labeled in FIG. 1 for clarity of illustration. The storage trays 150, 130 are in so-called vertical mounting configuration relative to a horizontally-mounted motherboard 114 (see also FIGS. 2, 8, and 9), which may comprise a printed circuit board (PCB). In the present disclosure, "horizontal" and "vertical" are relative to the floor of the computer room in which the storage bay 100 is deployed.

Figure 2:
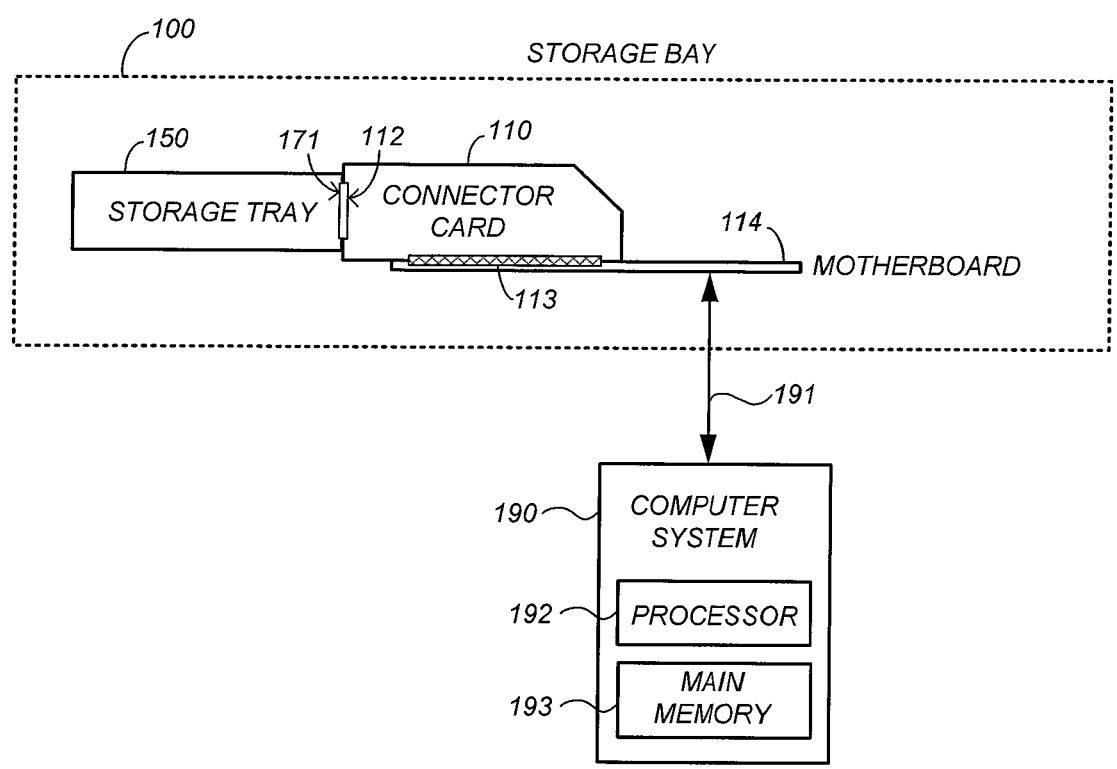
FIG. 2 shows a schematic diagram of the storage bay of FIG. 1 as attached to a computer system in accordance with an embodiment of the present invention.

FIG. 2 shows a schematic diagram of the storage bay 100 as attached to a computer system 190 in accordance with an embodiment of the present invention. Generally speaking, a connector card 110 is configured to allow a storage tray 150 or 130 to be mechanically and electrically connected to a computer bus 191 of the computer system 190. Only the storage tray 150 is shown in FIG. 2 for clarity of illustration. In the example of FIG. 2, the computer system 190 includes one or more processors 192, main memory 193 (e.g., random-access memory), and other components. The computer system 190 is commercially-available from various computer vendors, such as Super Micro Computer, Inc. of San Jose, Calif.

A connector card 110 comprises a bay connector 112 and an array of bay terminals 113 (see also FIGS. 8 and 9). The bay connector 112 is configured to removably mate with a tray connector 171, 131 of a corresponding storage tray 150, 130. In one embodiment, the bay connector 112 is a slot-type connector, which is configured to receive an edge-type tray connector 171, 131. The bay terminals (e.g., pins) 113 of a connector card 110 are configured to be connected to the computer bus 191. In one embodiment, the bay terminals 113 are configured to be fixedly connected (e.g., soldered) to corresponding pins of a PCIE bus on the motherboard 114. The bay terminals 113 may also be part of a PCIE connector that is removably connected to a corresponding PCIE connector on the motherboard 114.

Referring back to the example of FIG. 1, a storage tray 150, 130 comprises an SSD module, which in one embodiment is an NVME module. Generally speaking, a particular computer vendor expects a storage tray to comply with certain mechanical and electrical requirements to be compatible with that vendor's storage bays. Deviating from the requirements prevents a storage tray from being installed in the storage bay of that particular computer vendor.

In the example of FIG. 1, the storage tray 130 is a conventional storage tray. Some storage trays 130 may comply with the so-called Next-generation Small Form Factor (NGSFF) specification promulgated by the Samsung™ company. In such storage trays 130, the tray connector 131 is an NGSFF connector. Other storage trays 130 may comply with the so-called Enterprise and Data Center Solid State Drive Form Factor (EDSFF) specification promulgated by the Intel™ corporation and other computer vendors. In that case, the tray connector 131 is an EDSFF connector.

A problem with conventional storage trays is that the NGSFF and ESDFF specifications are not mechanically and electrically compatible with each other. In other words, a storage tray 130 that complies with the NGSFF specification cannot be installed in a storage bay that complies with the EDSFF specification, and vice versa. More particularly, the NGSFF and ESDFF specifications require different connector types, pinouts, etc. Therefore, for cost and compatibility reasons, an enterprise customer has to commit to, and thus be limited by, a particular form factor specification. Another problem with conventional storage trays is that they do not provide adequate thermal management, which may result in heat build-up in storage bays that contain several storage trays.

Figure 3:
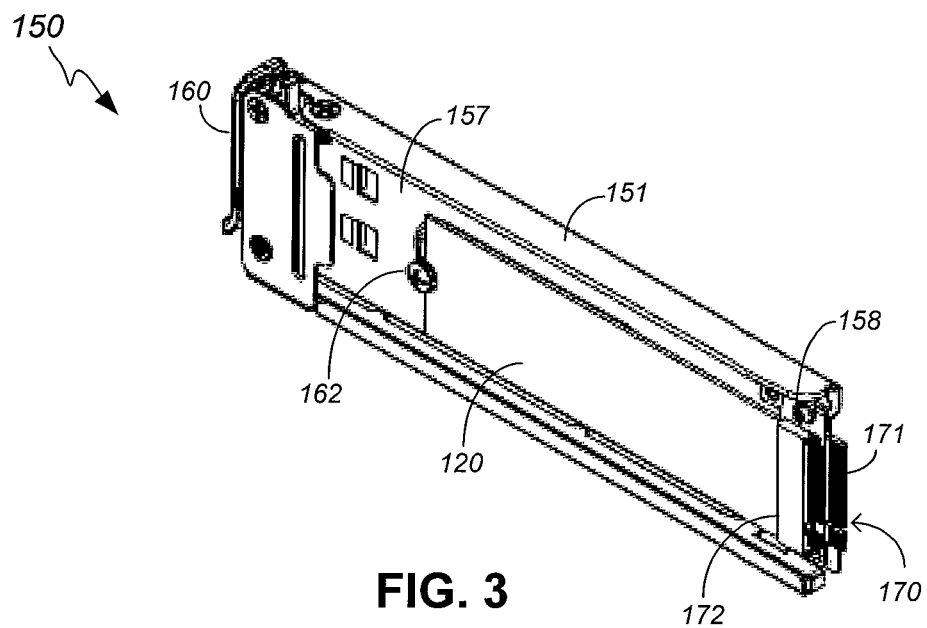
FIGS. 3 and 4 show a perspective view and an exploded view, respectively, of a storage tray in accordance with an embodiment of the present invention.
Figure 4:
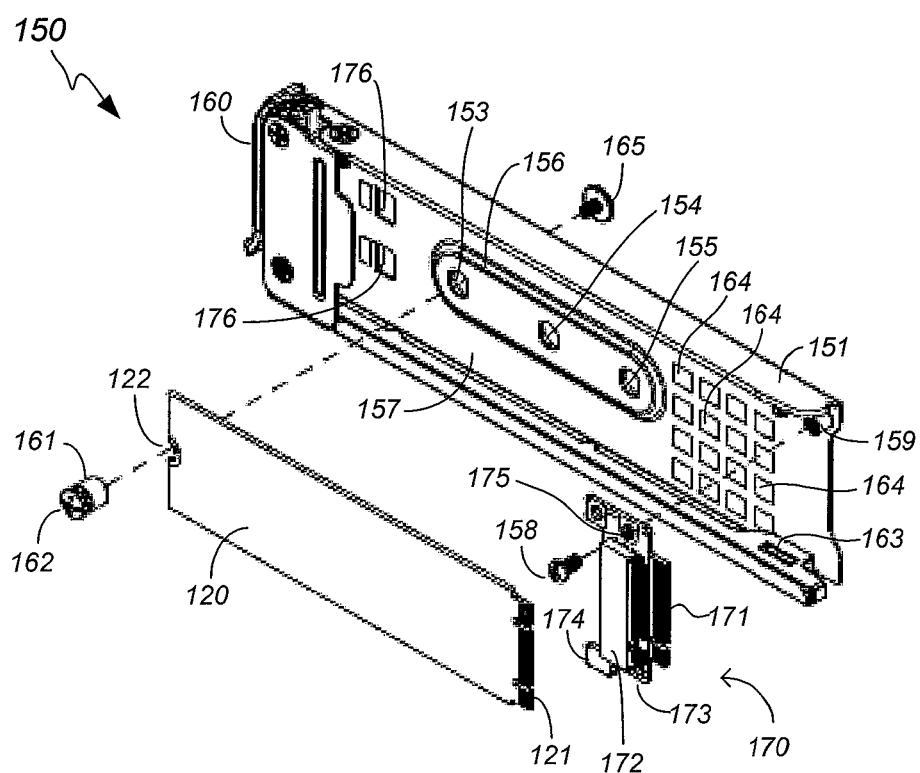

FIGS. 3 and 4 show a perspective view and an exploded view, respectively, of the storage tray 150 in accordance with an embodiment of the present invention. As shown in FIGS. 3 and 4, the storage tray 150 may comprise a frame 151, an SSD module 120, and an interposer 170. These features of the storage tray 150 are also labeled in FIG. 1 for orientation purposes.

Referring first to the perspective view of FIG. 3, the frame 151 may comprise a plate 157 to which the SSD module 120 and the interposer 170 are mounted. The SSD module 120 may be fastened to the plate 157 by a screw 162, and the interposer 170 may be fastened to the plate 157 by a screw 158. Standoffs (see FIGS. 4, 159 and 161) between the plate 157 and the SSD module 120 and interposer 170 allow for directed air-flow through the storage tray 150. An ejector 160 provides a lever that facilitates insertion and removal of the storage tray 150 into and out of the storage bay 100. The ejector 160 is rotatably attached to a point on the frame 151, and may be actuated by swinging the ejector 160.

To install the storage tray 150 into the storage bay 100, the tray connector 171 is inserted into a bay connector 112 of a corresponding connector card 110. This mechanically connects the terminals of the tray connector 171 to the terminals of the bay connector 112, thereby establishing an electrical connection between components of the SSD module 120 and the computer system 190 by way of the computer bus 191 (see FIG. 2). In this example where the SSD module 120 is an NVME module, the computer system 190 communicates with the SSD module 120 in accordance with the NVME specification.

For ease of illustration, components previously described with reference to FIG. 3 are also labeled in the exploded view of FIG. 4. As shown in FIG. 4, the plate 157 may have a raised portion 156 that has a plurality of mounting holes 153-155. This configuration allows the frame 151 to accommodate different sizes of SSD modules 120. More particularly, a standoff 161 may be attached to one of the mounting holes 153-155 to secure an SSD module 120 of a particular size. A notch 122 (e.g., on the circuit board) of an SSD module 120 may be secured between the standoff 161 and the screw 162. A corresponding screw 165 may be used to fasten the standoff 161 into the mounting hole 153, or other mounting hole depending on the dimensions of the SSD module 120. The SSD module 120 includes an edge-type connector 121, which is removably inserted into a slot-type connector 172 of the interposer 170. In one embodiment, the SSD module 120 is an NVME module that is compliant with the M.2 form factor specification. Accordingly, the connector 121 may be an M.2 connector. Generally speaking, the M.2 form factor specification allows SSD modules to have widths of 12 mm, 16 mm, 22 mm, and 30 mm, and lengths of 16 mm, 26 mm, 30 mm, 38 mm, 42 mm, 60 mm, 80 mm, and 110 mm. For illustration purposes only, the example of FIG. 4 shows an SSD module 120 with dimensions of 22 mm×80 mm (width×length), having a notch 122 that is secured to the standoff 161, which is mounted on the mounting hole 153. In one embodiment, an SSD module 120 is a commercially-available SSD module that complies with the NVME and M.2 specifications.

In one embodiment, the interposer 170 comprises a circuit card 173 (e.g., PCB), the connector 172, and the tray connector 171. The connector 172 is mounted on the circuit 173 on a vertical edge of the circuit card 173, and the tray connector 171 is mounted on an opposing vertical edge of the circuit card 173. The connector 121 of the SSD module 120 is removably connected to the connector 172, and the tray connector 171 is removably connected to a corresponding bay connector 112 of a connector card 110. The circuit card 173 includes wiring connections that allow electrical signals from the terminals of the connector 172 to be coupled to corresponding terminals of the tray connector 171.

In the example of FIG. 4, the circuit card 173 includes a mounting hole 175 on a horizontal edge and a mounting tab 174 on an opposing horizontal edge. To mount the interposer 170 to the frame 151, the mounting tab 174 is inserted into a slot 163 of the frame 151, and the mounting hole 175 is secured between the screw 158 and the standoff 159. The mounting tab 174 and the slot 163 allow for relatively easy and secure alignment of the interposer 170 using only a single screw on only one horizontal edge of the circuit board 173. In the example of FIG. 4, the plate 157 has a plurality of vent holes 164 directly underneath the plane of the interposer 170. The vent holes 164 serve as a cooling vent that allows cooling air to flow through a gap between the plate 157 and the undersides of the SSD module 120 and the interposer 170. A plurality of mounting holes 176 on the plate 157 allow electromagnetic interference (EMI) springs 180 (see FIGS. 5 and 6) to be mounted on the plate 157.

Figure 5:
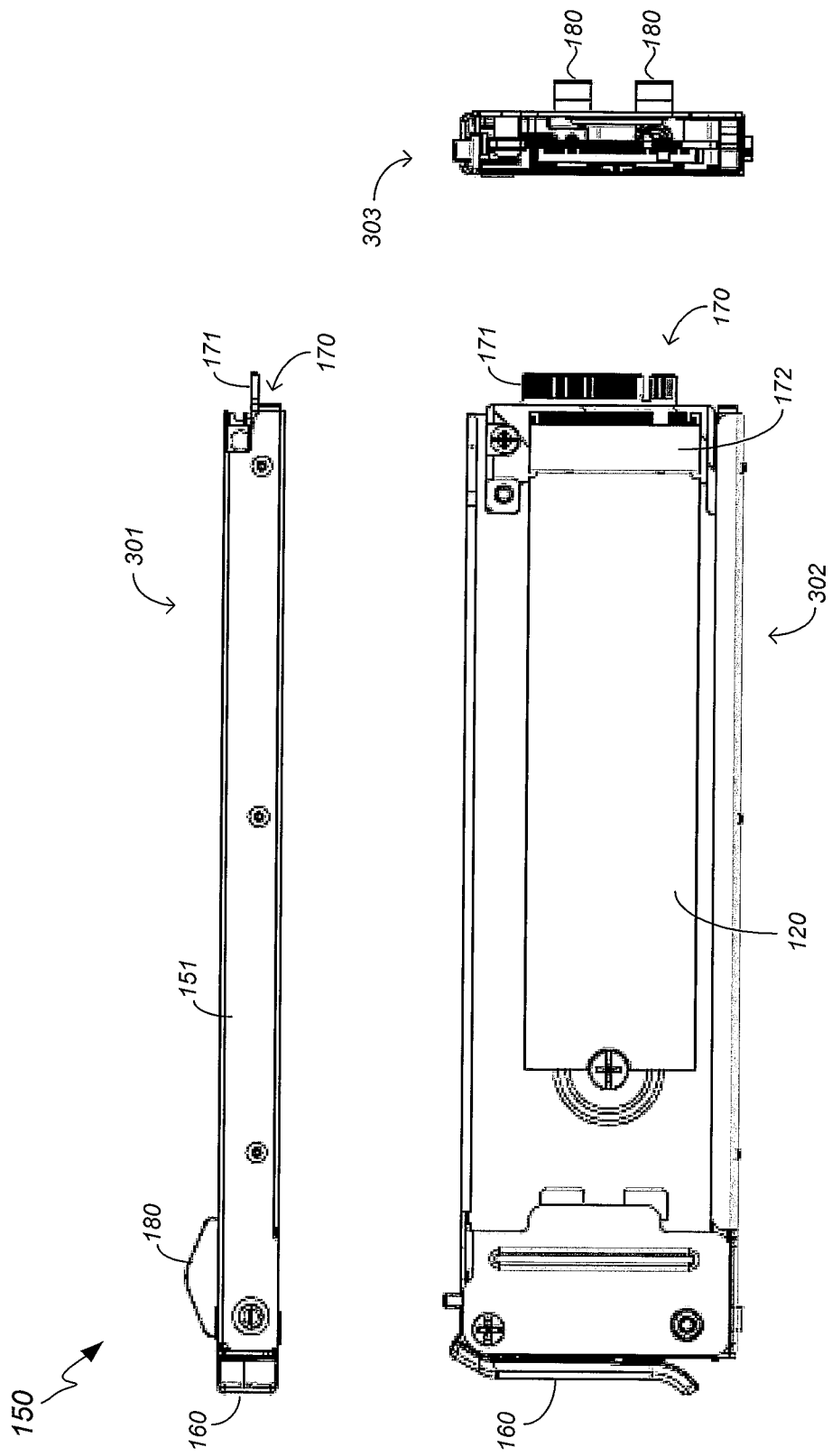
FIG. 5 shows a multi-view of the storage tray of FIGS. 3 and 4 in accordance with an embodiment of the present invention.

FIG. 5 shows a multi-view of the storage tray 150 in accordance with an embodiment of the present invention. FIG. 5 shows a top view 301, a side view 302, and an edge view 303. The top view 301 and the edge view 303 show EMI springs 180, which as noted may be installed to the storage tray 150 on the mounting holes 176 (see FIG. 4). The components labeled in FIG. 5 have been previously described with reference to FIGS. 3 and 4, and are noted in FIG. 5 for orientation purposes.

Figure 6:
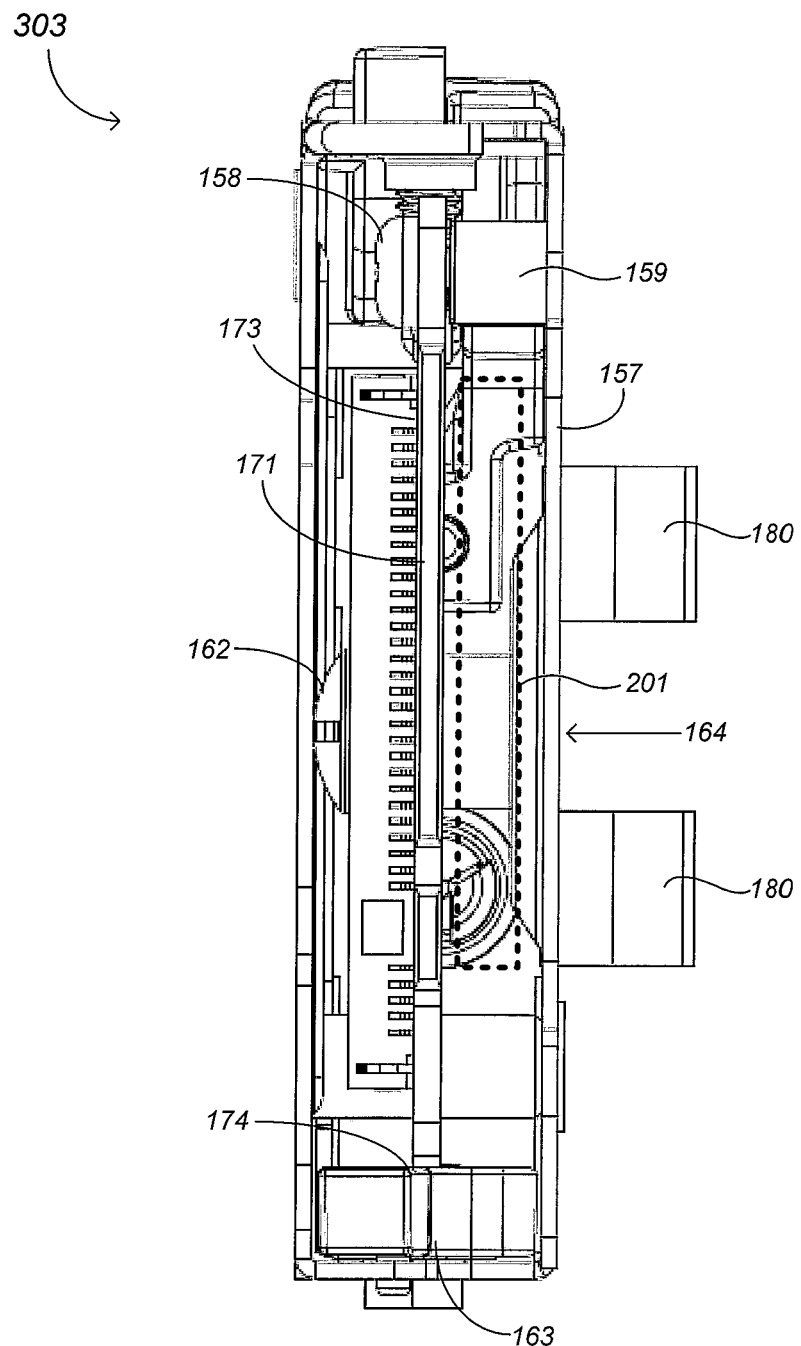
FIG. 6 is a larger drawing of an edge view of FIG. 5.

FIG. 6 is a larger drawing of the edge view 303 of FIG. 5. As shown in FIG. 6, the plane of the circuit card 173 of the interposer 170 is in parallel with the plane of the plate 157, with a gap 201 between them. The standoff 159 and the tab 174/slot 163 configuration raise the circuit card 173 away from the plate 157 to form the gap 201. The vent holes 164 (see FIG. 4) on the plate 157 allows air from the cooling unit (e.g., fans) of the storage bay 100 to flow in the gap 201 and thereby cool the components of the storage tray 150. The cooling air exits from the gap 201 to cool other storage trays installed in the storage bay 100. The EMI springs 180 compress to allow relatively tight electrical contact with an adjacent storage tray 150 to minimize or prevent electromagnetic/radio frequency interference (RFI) in the storage bay 100.

Figure 7:
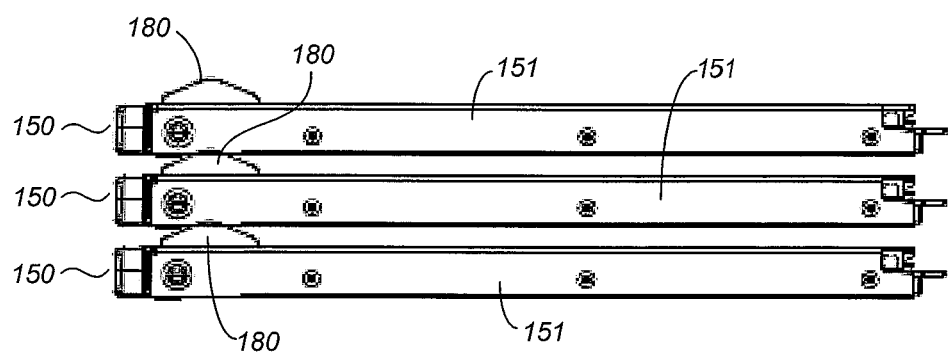
FIG. 7 shows a top view of a plurality of storage trays in accordance with an embodiment of the present invention.

FIG. 7 shows a top view of a plurality of storage trays 150 in accordance with an embodiment of the present invention. FIG. 7 shows the relative positions of adjacent storage trays 150 as installed in the storage bay 100. When a plurality of storage trays 150 are installed in the storage bay 100, an EMI spring 180 of one storage tray 150 makes an electrical connection with a frame 151 (or other shield point) of an adjacent storage tray 150 to maintain EMI/RFI shielding.

FIG. 8 shows an arrangement of an SSD module 120, an interposer 170A, and a connector card 110A in accordance with an embodiment of the present invention. The interposer 170A is a particular implementation of the interposer 170. As before, the interposer 170A and the SSD module 120 are mounted as part of a storage tray 150. An M.2 connector 121 of the SSD module 120 is removably connected to the connector 172 of the interposer 170A. In the example of FIG. 8, the interposer 170A includes an edge-type tray connector 171A that is compliant with the NGSFF specification. The circuit card 173A is a particular implementation of the circuit card 173. In the example of FIG. 8, the circuit card 173A of the interposer 170A provides wiring connections that allow electrical signals from the terminals of the connector 172 to be coupled to corresponding terminals of the tray connector 171A in compliance with the NGSFF specification. Also labeled in FIG. 8 are the tab 174A and mounting hole 175A of the circuit card 173A.

In the example of FIG. 8, the connector card 110A is a particular implementation of the connector card 110. The connector card 110A has a slot-type bay connector 112A that is configured to removably mate with the tray connector 171A of the interposer 170A. The bay connector 112A is compliant with the NGSFF specification. The bay terminals 113 of the connector card 110A may comprise pins that are electrically connected to a PCIE bus on the motherboard 114. The storage tray 150 is thus adaptable to allow an NVME module that is compliant with the M.2 form factor specification to connect to an NGSFF-compliant storage bay 100.

FIG. 9 shows an arrangement of an SSD module 120, an interposer 170B, and a connector card 110B in accordance with another embodiment of the present invention. The interposer 170B is a particular implementation of the interposer 170. As before, the interposer 170B and the SSD module 120 are mounted as part of a storage tray 150. An M.2 connector 121 of the SSD module 120 is removably connected to the connector 172 of the interposer 170B. In the example of FIG. 9, the interposer 170B includes an edge-type tray connector 171B that is compliant with the EDSFF specification. The circuit card 173B is a particular implementation of the circuit card 173. In the example of FIG. 9, the circuit card 173B of the interposer 170B provides wiring connections that allow electrical signals from the terminals of the connector 172 to be coupled to corresponding terminals of the tray connector 171B in compliance with the EDSFF specification. Also labeled in FIG. 9 are the tab 174B and mounting hole 175B of the circuit card 173B.

In the example of FIG. 9, the connector card 110B is a particular implementation of the connector card 110. The connector card 110B has a slot-type bay connector 112B that is configured to removably mate with the tray connector 171B. The bay connector 112B is compliant with the EDSFF specification. The bay terminals 113 of the connector card 110B may comprise pins that are electrically connected to a PCIE bus on the motherboard 114. The storage tray 150 is thus adaptable to allow an NVME module that is compliant with the M.2 form factor specification to connect to an EDSFF-compliant storage bay 100.

Figure 10:
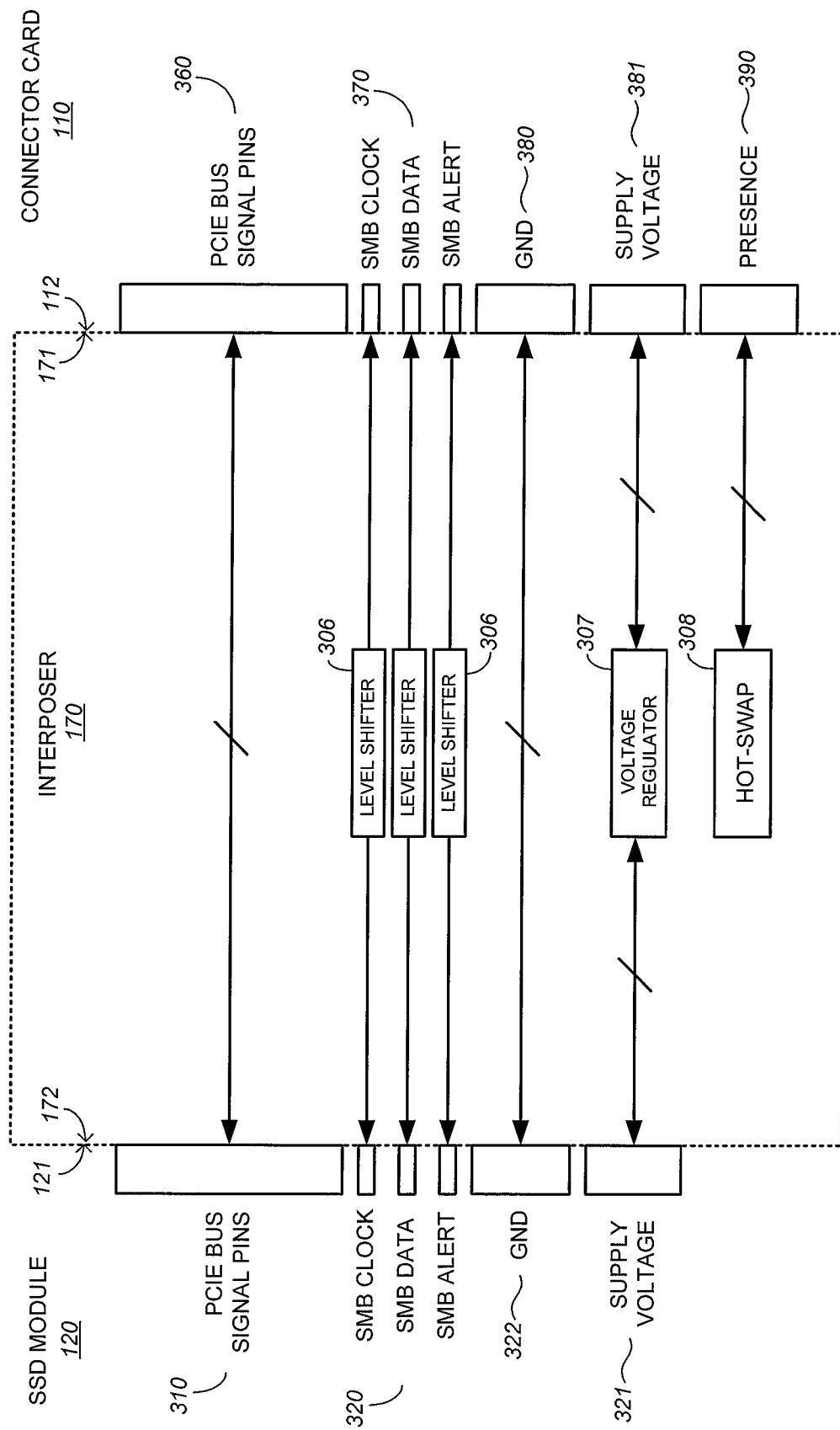
FIG. 10 shows a schematic diagram of an interposer in accordance with an embodiment of the present invention.

FIG. 10 shows a schematic diagram of an interposer 170 in accordance with an embodiment of the present invention. As previously noted, an interposer 170 may include a connector 172 that is removably connected to a connector 121 of an SSD module 120, and a tray connector 171 that is removably connected to a bay connector 112 of a connector card 110.

In the example of FIG. 10, the SSD module 120 is an NVME module that is compliant with the M.2 form factor specification. In one embodiment, the interposer 170 comprises wirings (e.g., PCB traces) that directly connect PCIE bus signal pins 310 of the SSD module 120 to corresponding PCIE bus signal pins 360 of the connector card 110. The SSD module 120 further includes provisions for connecting System Management Bus (SMB) signal (e.g., clock, data) pins 320 to corresponding SMB signal pins 370 of the connector card 110. In the example of FIG. 10, the interposer 170 includes a level shifter circuit 306 that is configured to translate the logic levels of SMB signals for compatibility between the SSD module 120 and the connector card 110.

In the example of FIG. 10, the interposer 170 includes wirings that directly connect ground reference pins 322 of the connector 121 of the SSD module 120 to ground reference pins 380 of the bay connector 112 of the connector card 110. The interposer 170 further includes a voltage regulator 307 that is configured to receive supply voltage from the supply voltage pins 381 of the bay connector 112 of the connector card 110, and to provide supply voltage to the supply voltage pins 321 of the connector 121 of the SSD module 120. In one embodiment, the voltage regulator 307 is a step-down voltage regulator. As a particular example, the voltage regulator 307 may be configured to lower a 12V supply voltage received from the connector card 110 to 3.3V, which is provided to the SSD module 120.

In one embodiment, the interposer 170 further includes a hot-swap circuit 308, which is configured to allow the SSD module 120 to be hot-swappable to the connector card 110. More particularly, the hot-swap circuit 308 allows an SSD module 120 that is compliant with the M.2 form factor specification, which is not hot-swappable, to be inserted and removed from the connector card 110 while power is provided on the supply voltage pins 381, i.e., while the storage bay 100 remains powered up. In one embodiment, the hot-swap circuit 308 is electrically connected to one or more presence pins 390 on the bay connector 112 of the connector card 110. Any suitable discrete or integrated circuit hot-swap circuit may be employed without detracting from the merits of the present invention.

As can be appreciated from the foregoing, the connections shown in FIG. 10 may be modified depending on the connector card 110. For example, when the connector card 110 is an NGSFF connector card (e.g., FIG. 8, 110A), the SMB alert pin of the SSD module 120 for indicating to the computer system 190 that the SMB requires attention would be connected to a corresponding SMB alert pin on the connector card 110, as in FIG. 10. However, when the connector card 110 is an EDSFF connector card (e.g., FIG. 9, 110B), the SMB alert pin of the SSD module 120 is left as an open trace, i.e., not connected.

Embodiments of the present invention provide many advantages heretofore unrealized. First, embodiments of the present invention allow an SSD storage bay to receive SSD modules that are compliant with different specifications, thereby reducing the cost of operating and maintaining an enterprise computer system. Second, embodiments of the present invention allow SSD modules to have hot-swap capability. Third, embodiments of the present invention allow SSD storage bays to have adequate cooling even with several storage trays installed.

Adaptable SSD storage bays and associated components have been disclosed. While specific embodiments of the present invention have been provided, it is to be understood that these embodiments are for illustration purposes and not limiting. Many additional embodiments will be apparent to persons of ordinary skill in the art reading this disclosure.

What is claimed is:

1. A solid state drive (SSD) storage bay for a computer system, the SSD storage bay comprising:
   a plurality of storage trays, each storage tray of the plurality of storage trays comprising a frame, an SSD module that is fastened to the frame, and an interposer that is fastened to the frame, the interposer comprising a first connector and a second connector, the SSD module comprising a third connector, wherein the third connector of the SSD module is removably connected to the first connector of the interposer; and
   a plurality of bay connectors, each bay connector of the plurality of bay connectors being removably connected to the second connector of the interposer of a corresponding storage tray of the plurality of storage trays and connected to a computer bus,
   wherein a plate of the frame is in parallel with a plane of the interposer.

2. The SSD storage bay of claim 1, wherein the interposer further comprises a plurality of wirings that interconnect pins of the first connector of the interposer to pins of the second connector of the interposer.

3. The SSD storage bay of claim 2, wherein a first subset of the plurality of wirings directly connect a first set of pins of the first connector of the interposer to a first set of pins of the second connector of the interposer.

4. The SSD storage bay of claim 2, wherein the interposer further comprises a voltage regulator that receives an input voltage from a first pin of the second connector of the interposer and provides an output voltage to a first pin of the first connector of the interposer.

5. The SSD storage bay of claim 4, wherein the voltage regulator is a step-down voltage regulator.

6. The SSD storage bay of claim 4, wherein the voltage regulator receives a 12V input voltage from the first pin of the second connector of the interposer and generates a 3.3V output voltage to the first pin of the first connector of the interposer.

7. The SSD storage bay of claim 2, wherein the interposer further comprises a plurality of level shifters that translate logic levels of signals between a second set of pins of the first connector of the interposer and a second set of pins of the second connector of the interposer.

8. A solid state drive (SSD) storage bay for a computer system, the storage bay comprising:
   a frame;
   an interposer that is fastened to the frame, the interposer comprising a first connector, a second connector, a voltage regulator, and a plurality of wirings that connect a plurality of pins of the first connector of the interposer to a plurality of pins of the second connector of the interposer;
   an SSD module that is fastened to the frame, the SSD module comprising a third connector that is removably connected to the first connector of the interposer;
   a motherboard; and
   a bay connector that is connected to the motherboard and the second connector of the interposer,
   wherein the voltage regulator is configured to receive an input voltage from a first pin of the second connector of the interposer and provide an output voltage at a first pin of the first connector of the interposer, and
   wherein a plate of the frame is in parallel with a plane of the interposer.

9. The SSD storage bay of claim 8, wherein the voltage regulator is a step-down voltage regulator.

10. The SSD storage bay of claim 8, wherein the voltage regulator receives a 12V input voltage from the first pin of the second connector of the interposer and generates a 3.3V output voltage to the first pin of the first connector of the interposer.

11. The SSD storage bay of claim 8, wherein a first set of wirings of the plurality of wirings of the interposer connect a first set of pins of the first connector of the interposer directly to a corresponding first set of pins of the second connector of the interposer.

12. The SSD storage bay of claim 11, further comprising a plurality of level shifters that are configured to translate logic levels of signals between a second set of pins of the first connector of the interposer and a second set of pins of the second connector of the interposer.

13. The SSD storage bay of claim 8, wherein the plate of the frame has a plurality of vent holes that face the plane of the interposer.

14. A storage tray for a solid state drive (SSD) storage bay, the storage tray comprising:
   a frame having a first end that is configured to face towards a bay connector of the SSD storage bay and a second end that is opposite the first end, the frame comprising an ejector for facilitating removal of the storage tray from the SSD storage bay, the ejector being attached to the second end;
   an interposer that is fastened to the frame, the interposer comprising a first connector, a second connector that is configured to be removably connected to the bay connector, and a voltage regulator; and
   an SSD module that is fastened to the frame, the SSD module comprising a third connector,
   wherein the third connector of the SSD module is removably connected to the first connector of the interposer, and the voltage regulator is configured to receive an input voltage from a first pin of the second connector of the interposer and to generate an output voltage at a first pin of the first connector of the interposer, and
   wherein a plate of the frame is in parallel with a plane of the interposer.

15. The storage tray of claim 14, wherein the interposer further comprises a plurality of wirings that connect a plurality of pins of the first connector of the interposer to a plurality of pins of the second connector of the interposer.

16. The storage tray of claim 14, wherein the ejector comprises a lever that is rotatably mounted on the frame.

17. The storage tray of claim 14, further comprising an electromagnetic interference (EMI) spring that is connected to the frame.

18. The storage tray of claim 14, wherein the interposer further comprises:
   a hot-swap circuit between a second pin of the second connector of the interposer and a second pin of the first connector of the interposer.

19. The storage tray of claim 14, wherein the plate includes a plurality of vent holes that are positioned in front of the plane of the interposer, and further comprising a standoff that raises the interposer away from the plate such that an air gap is formed between the vent holes and the plane of the interposer.

* * * * *